(12) United States Patent
Loftesness et al.

(10) Patent No.: US 7,840,459 B1
(45) Date of Patent: Nov. 23, 2010

(54) METHOD AND APPARATUS FOR IDENTITY THEFT PREVENTION

(75) Inventors: Scott J Loftesness, Menlo Park, CA (US); Carol C Benson, Ashland, OR (US)

(73) Assignee: Visa U.S.A. Inc., San Francisco, CA (US)

( * ) Notice: Subject to any disclaimer, the term of this patent is extended or adjusted under 35 U.S.C. 154(b) by 1082 days.

(21) Appl. No.: 10/850,975

(22) Filed: May 21, 2004

Related U.S. Application Data

(60) Provisional application No. 60/473,175, filed on May 22, 2003.

(51) Int. Cl.
*G06Q 40/00* (2006.01)

(52) U.S. Cl. .......................................... 705/35; 705/38

(58) Field of Classification Search ............... 705/35–45
See application file for complete search history.

(56) References Cited

U.S. PATENT DOCUMENTS

| | | | |
|---|---|---|---|
| 6,347,307 B1 * | 2/2002 | Sandhu et al. ............ 705/36 R |
| 7,240,363 B1 * | 7/2007 | Ellingson ........................ 726/5 |
| 2002/0023054 A1 * | 2/2002 | Gillespie ....................... 705/39 |
| 2002/0046152 A1 * | 4/2002 | Kinney et al. ................. 705/37 |
| 2002/0073344 A1 * | 6/2002 | Maritzen et al. ............ 713/202 |
| 2002/0087460 A1 * | 7/2002 | Hornung ...................... 705/38 |
| 2003/0046237 A1 * | 3/2003 | Uberti .......................... 705/44 |
| 2003/0163413 A1 * | 8/2003 | Wiczkowski ................. 705/38 |
| 2004/0006537 A1 * | 1/2004 | Zelechoski et al. ............ 705/39 |
| 2004/0054619 A1 * | 3/2004 | Watson et al. ................. 705/38 |
| 2005/0021476 A1 * | 1/2005 | Candella et al. ............... 705/64 |
| 2005/0071282 A1 * | 3/2005 | Lu et al. ....................... 705/64 |
| 2005/0165667 A1 * | 7/2005 | Cox .............................. 705/35 |
| 2005/0209914 A1 * | 9/2005 | Nguyen et al. ................ 705/14 |
| 2007/0061256 A1 * | 3/2007 | Park et al. ..................... 705/40 |
| 2008/0235043 A1 * | 9/2008 | Goulandris et al. ............ 705/1 |

\* cited by examiner

*Primary Examiner*—Jagdish N Patel
*Assistant Examiner*—Kevin Poe
(74) *Attorney, Agent, or Firm*—Townsend and Townsend and Crew LLP

(57) ABSTRACT

A system and method issues a credit card or other credit instrument to a user by first obtaining authorization and authentication from the user.

14 Claims, 2 Drawing Sheets

METHOD AND APPARATUS FOR IDENTITY THEFT PREVENTION

RELATED APPLICATIONS

This application claims the benefit of U.S. provisional patent application Ser. No. 60/473,175 entitled, "Identity Theft Application Prevention" filed on May 22, 2003 by Scott James Loftesness and Carol Coye Benson and is incorporated herein by reference in its entirety.

FIELD OF THE INVENTION

The present invention is related to computer software and more specifically to computer software for financial services.

BACKGROUND OF THE INVENTION

Identity theft in the United States is already a large and rapidly growing problem. A recent estimate by analyst Jim Hurley of the Aberdeen Group indicate it is growing at 300% annually from a base estimated at $221 billion in financial losses in 2003. Quoting from his analysis:

Profits are high; risks are low. At $9,800 per-incident, identity theft is paying much better than bank robbery, while organized identity theft criminal rings are largely immune from criminal prosecution. (See: The Business of Identity Theft—Not Just a Consumer Problem, Aberdeen Group, May 2003)

Visa and its member banks have a serious interest in preventing identity theft, and in helping consumers—and defrauded banks—minimize any losses when identity theft occurs. The Role of Bank Cards in Identity Theft One technique that identity thieves use is to establish new, fraudulent credit card accounts using stolen names, Social Security numbers, and other supporting identification. Although this is only one of the many types of crimes identity thieves commit, the relative ease with which this can be accomplished is one of the primary reasons for the growth of identity theft. Quite simply, the ability to open new, fraudulent credit card accounts and to use these cards to purchase goods or obtain cash advances is one of the financial beacons that attracts many identity thieves. Industry initiatives (such as Visa's recent announcement of an identity theft management program in cooperation with Call to Action) focus primarily on what consumers should do to protect their personal information or to help minimize the impact once an identity theft has already occurred. Credit bureaus have programs designed to help consumers manage post-incident identity theft and, through various email-based alert programs, help consumers detect identity theft earlier. New startups have emerged which are also attempting to address the problem of identity theft. For example, San Diego-based IDanalytics, a startup funded last fall by Canaan Ventures and Trinity Ventures, recently announced it was working with thirteen leading credit grantors to apply pattern recognition technology to detect and prevent identity theft at the point of application. Participating companies include Citibank, Dell, Diners Club, Discover Financial Services, First North American National Bank and Sprint (See: "Software Helps Spot Fraud in Credit Applications", Wall Street Journal, May 14, 2003). IDanalytics claims its system can identify 15% to 40% of fraudulent applications. Importantly, there is no mechanism that guarantees to a consumer that identity theft will not occur.

SUMMARY OF INVENTION

A system and method can be utilized by credit grantors in the United States to obtain consumer assurance and agreement prior to opening new credit accounts thereby significantly reducing the possibility of successful identity theft being perpetrated.

DETAILED DESCRIPTION OF A PREFERRED EMBODIMENT

Figure 1:
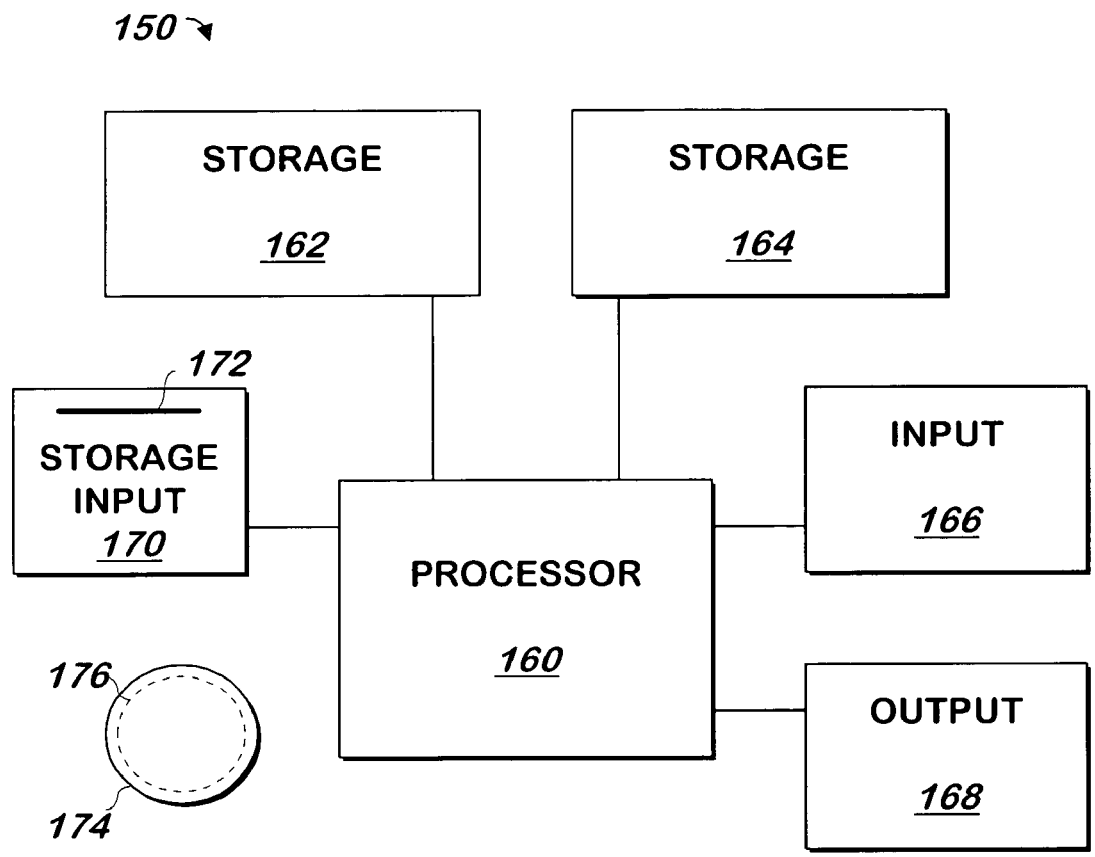
FIG. 1 is a block schematic diagram of a conventional computer system.

The present invention may be implemented as computer software on a conventional computer system. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional SUN MICROSYSTEMS ULTRA 10 workstation running the SOLARIS operating system commercially available from SUN MICROSYSTEMS, Inc. of Mountain View, Calif., a PENTIUM-compatible personal computer system such as are available from DELL COMPUTER CORPORATION of Round Rock, Tex. running a version of the WINDOWS operating system (such as 95, 98, Me, XP, NT or 2000) commercially available from MICROSOFT Corporation of Redmond Wash. or a Macintosh computer system running the MACOS or OPENSTEP operating system commercially available from APPLE COMPUTER CORPORATION of Cupertino, Calif. and the NETSCAPE browser commercially available from NETSCAPE COMMUNICATIONS CORPORATION of Mountain View, Calif. or INTERNET EXPLORER browser commercially available from MICROSOFT above, although other systems may be used.

Banks in the United States that offer credit cards currently use a service created by Visa and MasterCard called the Issuers' Clearinghouse Service (ICS). ICS provide's credit grantors with certain limited shared information about card applicants. In one application of this invention, Visa could help its cardholders by addressing one of the major sources of identity theft. By offering a mechanism that requires the active consent of a cardholder prior to opening a new Visa card account. Let's call that mechanism "Proof Positive from Visa". In so doing, Visa could provide "proof positive" to both the cardholder and the potential new Visa card issuer that only the real cardholder has, in fact, requested the new credit card account. The Proof Positive mechanism would leverage the investments already made in the Issuers' Clearinghouse Service developed by Visa and MasterCard. Currently, Visa and MasterCard issuers are required to report and check all new Visa card applications against the ICS database. In response, ICS provides them with information that assists in making the credit granting decision for a new account. Proof Positive would enable Visa to guarantee that cardholders who register to participate in the program would never experience new account Visa card-related identity theft.

Figure 2:
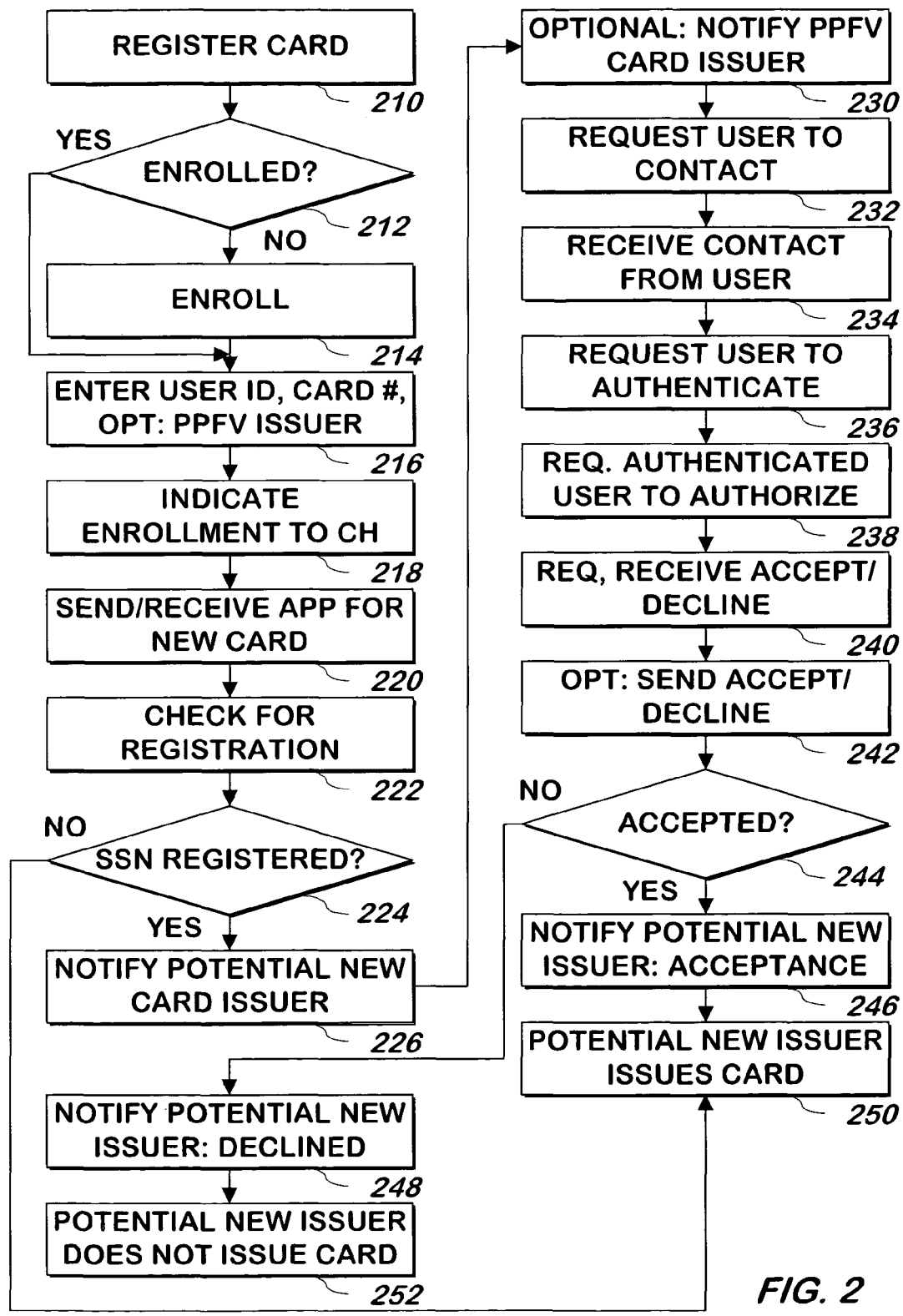
FIG. 2 is a flowchart illustrating a method of issuing a credit card or other credit instrument to a user according to one embodiment of the present invention.

FIG. 2 is a flowchart illustrating a method of issuing a credit card or other instrument to a user according to one embodiment of the present invention. One way that Proof Positive from Visa ("PPfV") could work is as follows: A Visa cardholder would register 210 an existing Visa card for PPfV with a participating issuing bank online. If not already enrolled in Verified by Visa ("VbV") 212, the cardholder could enroll 214 in VbV (or another means of authentication) for that card. Through this process, that specific Visa issuer becomes the PPfV registered issuer for that consumer. The issuer then enters 216 the cardholder's primary PPfV card number and Social Security Number (SSN) into the ICS (or other) database which then sets 218 a PPfV-enrolled indicator for that SSN. The issuer may be identified from the card number or an identifier of the issuer may also be entered into the ICS or other database.

As usual with ICS, all new Visa card applications would continue to be sent 220 through ICS which would perform an additional check 222 to determine if the SSN on the application submitted matched a registered PPfV cardholder. If an SSN match occurred 224, the new card issuer would be notified 226 by ICS and would not be able to proceed with issuing the new card until it had received an additional clearance message from ICS, and if an SSN match did not occur 224, the new card issuer could issue the card 250 or attempt other methods of authentication and authorization. ICS would notify 230 the PPfV registered card issuer for that cardholder that a PPfV verification is now requested or required from their cardholder. The PPfV registered card issuer would then send 232 an email or other communication to the cardholder requesting that the cardholder authorize or decline issuance of the new card. (Note that this email confirmation process could be performed on the issuer's behalf by Visa as an adjunct service to ICS.) The email would contain an active link which, when selected by the cardholder (or if the cardholder otherwise indicated assent to the card being issued) 234, would trigger 236 a pop-up window requesting VbV or other authentication 238 and explicit cardholder approval (or decline) for opening the new account and such approval or decline would be received 240. The results of the authentication and approval/decline would be sent 242 by the PPfV registered card issuer to ICS (unless ICS was receiving the approval or decline directly). Based on the results of the authentication and approval process 244, ICS would then notify the new card issuer that they are either "good to go" 246 or forbidden to issue the card 248 and the new card issuer would issue 250 the card only if the good to go notification was received and would not issue the card if they were notified that they were forbidden to issue the card 252. Through the use of ICS as a trusted, neutral, third party, in one embodiment, neither of the two issuers participating in this process would know the identity of the other issuer. With this basic design, the PPfV card issuer would receive notification that the consumer may be attempting to open a new card account with a different issuer. Alternative designs may be able to completely eliminate the PPfV issuer notification should it be considered problematic. For example, in one alternative implementation the ICS system could directly obtain a purchase authorization request from one of several proxy merchants in order to obtain a VbV validation response from PPfV issuer. The present invention applies to the issuance of all credit instruments, not just credit cards.

What is claimed is:

1. A method comprising:
  a) providing by a first issuer bank a first credit instrument to a user;
  b) receiving a request at a computer system operated by the first issuer bank to contact the user before a second issuer bank issues a second credit instrument to the user;
  c) using the computer system, contacting the user by the first issuer bank to request that the user authorize or decline the issuance of the second credit instrument by the second issuer bank;
  d) receiving a response from the user at the computer system at the first issuer bank as to whether the user authorizes or declines the issuance of the second credit instrument; and
  e) using the computer system, providing a notification by the first issuer bank regarding the response from the user as to whether the user authorizes or declines the issuance of the second credit instrument,
  wherein e) providing the notification regarding the response from the user as to whether the user authorizes or declines the issuance of the second credit instrument comprises notifying an issuer clearinghouse service regarding the response from the user as to whether the user authorizes or declines the issuance of the second credit instrument, wherein the issuer clearinghouse service thereafter notifies the second issuer bank as to whether the user authorizes or declines the issuance of the second credit instrument, wherein an identifier of the user along with a registered issuer identifier were entered into a database operated by the issuer clearinghouse service, wherein the registered issuer identifier is associated with the first issuer bank; and
  wherein the second issuer bank does not know the identity of the first issuer bank as the method is performed, and wherein the method further comprises
  determining, by the computer system, if the identifier of the user received from the second issuer bank matches the identifier of the user previously stored in the database, and if there is no match, then notifying the second issuer bank that the second issuer bank is allowed to issue the second credit instrument.

2. The method of claim 1 wherein c) contacting the user by the first issuer bank to request that the user authorize or decline the issuance of the second credit instrument comprises transmitting an email to the user with an active link that when selected generates a window requesting:

authentication of the user; and approval or disapproval of issuance of the second credit instrument.

3. The method of claim 1 wherein the identifier of the user is the user's social security number.

4. The method of claim 1 wherein c) contacting the user by the first issuer bank to request that the user authorize or decline the issuance of the second credit instrument comprises transmitting an email to the user requesting that the user authorize or decline the issuance of the second credit instrument.

5. The method of claim 1 wherein the first and second credit instruments are respectively first and second credit cards.

6. The method of claim 1 wherein prior to b) receiving the request at the computer system operated by the first issuer bank to contact the user before the second issuer bank issues the second credit instrument to the user, the issuer clearinghouse service determines that the identifier of the user received from the second issuer bank matches the identifier of the user previously stored in the database.

7. The method of claim 6 wherein the identifier of the user received from the second issuer bank is the user's social security number and the identifier of the user previously stored in the database is also the social security number.

8. The method of claim 5 wherein the identifier of the user is the user's social security number.

9. The method of claim 1 wherein the request includes the identifier of the user.

10. The method of claim 9 wherein prior to b) receiving the request at the computer system operated by the first issuer bank to contact the user before the second issuer bank issues the second credit instrument to the user, the issuer clearinghouse service determines that the identifier of the user received from the second issuer bank matches the identifier of the user previously stored in the database.

11. The method of claim 1 further comprising obtaining a purchase authorization request from one of several proxy merchants in order to obtain a validation response from the first issuer bank.

12. The method of claim 11 wherein c) contacting the user by the first issuer bank to request that the user authorize or decline the issuance of the second credit instrument comprises transmitting an email to the user with an active link that when selected generates a window requesting:

authentication of the user; and approval or disapproval of issuance of the second credit instrument.

13. The method of claim 12 wherein the first credit instrument is a credit card.

14. The method of claim 13 wherein the identifier of the user is the user's social security number.

\* \* \* \* \*